US011872714B1

(12) United States Patent
Chiu

(10) Patent No.: US 11,872,714 B1
(45) Date of Patent: Jan. 16, 2024

(54) SCRAPER

(71) Applicant: GOODLY-CH ENTERPRISE CO., LTD., Taichung (TW)

(72) Inventor: Chin-Shun Chiu, Taichung (TW)

(73) Assignee: GOODLY-CH ENTERPRISE CO., LTD., Taichung (TW)

( * ) Notice: Subject to any disclaimer, the term of this patent is extended or adjusted under 35 U.S.C. 154(b) by 0 days.

(21) Appl. No.: 17/987,956

(22) Filed: Nov. 16, 2022

(51) Int. Cl.
*B26B 5/00* (2006.01)

(52) U.S. Cl.
CPC .................................... *B26B 5/006* (2013.01)

(58) Field of Classification Search
CPC ............ B26B 5/006; B26B 5/00; A47L 13/08
USPC ........................................................ 30/337, 2
See application file for complete search history.

(56) References Cited

U.S. PATENT DOCUMENTS 1,565,186 A * 12/1925 Moon ..................... B26B 5/006 30/536
1,719,217 A * 7/1929 Freiss ..................... B26B 5/006 30/151
2,336,284 A * 12/1943 Nelson .................... B26B 5/006 30/333
2,404,141 A * 7/1946 Nelson .................... B26B 5/006 30/162
2,494,455 A * 1/1950 Soldani ................... A47L 13/08 30/353
3,101,185 A * 8/1963 Gustafson ............ A47G 25/481 24/538
4,955,138 A * 9/1990 Henke ..................... A47L 13/08 30/169
5,022,156 A * 6/1991 Kallens ..................... B26B 5/00 30/337
5,056,226 A * 10/1991 Gringer ................... B44C 7/027 30/169
5,208,984 A * 5/1993 Negus ..................... B26B 5/006 30/169
5,924,204 A * 7/1999 Lane ...................... B44D 3/164 30/169
7,814,608 B1 * 10/2010 Catello ................. A47L 13/022 30/169
7,930,831 B2 * 4/2011 Lin ........................ B44D 3/164 30/169
8,171,646 B2 * 5/2012 Chiu ....................... B26B 5/005 30/169
8,356,415 B2 1/2013 Lin
10,723,030 B2 * 7/2020 Chiu ....................... B26B 5/006
10,836,055 B2 * 11/2020 Su ........................... B26B 5/005
(Continued)

*Primary Examiner* — Omar Flores Sanchez
(74) *Attorney, Agent, or Firm* — Best & Flanagan LLP

(57) ABSTRACT

A scraper includes a first clamping member, a second clamping member, and a locking device. The first clamping member has a first clamping portion and a first connecting portion. The second clamping member has a second clamping portion and a second connecting portion connected with the first connecting portion. The locking device includes a pivoting shaft connected with the first and second pivoting portions, and a switching button disposed on the second clamping member and connected with the pivoting shaft. The switching button is relatively rotatable between a locking position and a releasing position with the pivoting shaft as the center with an angle of less than 180 degrees to cause the second clamping portion to approach or move away from the first clamping portion.

7 Claims, 6 Drawing Sheets

(56) References Cited

U.S. PATENT DOCUMENTS

| | | | | |
|---|---|---|---|---|
| 2019/0134831 | A1* | 5/2019 | Chiu | A47L 13/08 |
| 2019/0232507 | A1* | 8/2019 | Su | B26B 5/00 |

* cited by examiner

SCRAPER

BACKGROUND

The present invention relates to a scraper and, more particular, to a scraper that can be quickly assembled and replaced for a scraper blade.

U.S. Pat. No. 8,356,415 provides a scraping tool that can be assembled and replaced for a scraper blade quickly. The scraping tool in general comprises a stick for hand grasp and a scraping section in the front. The scraping tool mainly uses an arm of suitable length extended from the back end of a jaw clamp toward the middle. It uses fasteners to be located inside the groove in the back of the scraping section. The fastener is also used as pivot for the arm to swing back and forth. On the arm in the back of the jaw clamp, there is a control button that provides vertical pushing force in the back of the jaw clamp.

However, the scraping tool uses a cam structure of the control button to generate a clamping force for the jaw clamp to clamp the scraper blade. The scraping tool has a complicated structure and is relatively expensive to manufacture.

Thus, a need exists for a scraper to mitigate and/or obviate the above disadvantages.

SUMMARY

An objective of the present invention is to provide a scraper including a first clamping member, a second clamping member, and a locking device. The first clamping member has a first clamping portion, a first connecting portion, and a first pivoting portion disposed between the first clamping portion and the first connecting portion. The second clamping member has a second clamping portion, a second connecting portion connected with the first connecting portion, and a second pivoting portion disposed between the second clamping portion and the second connecting portion. One side of the second clamping member opposite to the first clamping member is provided with a first pressed portion. The second clamping member is elastically swayable to cause the second clamping portion to approach or move away from the first clamping portion. The locking device includes a pivoting shaft connected with the first pivoting portion and the second pivoting portion, and a switching button disposed on the side of the second clamping member opposite to the first clamping member and connected with the pivoting shaft. The switching button is provided with a first pressing portion and is relatively rotatable between a locking position and a releasing position with the pivoting shaft as the center with an angle of less than 180 degrees. The first pressing portion abuts against the first pressed portion to cause the second clamping portion to approach the first clamping portion when the switching button is in the locking position. The first pressing portion detaches from the first pressed portion to cause the second clamping portion to move away from the first clamping portion when the switching button is in the releasing position.

In an embodiment, the side of the second clamping member opposite to the first clamping member is further provided with a recess. One end of the recess is adjacent to the second clamping portion and another end of the recess is adjacent to the second connecting portion. The second pivoting portion is disposed in the recess. The first pressed portion is adjacent to the recess. The switching button is elongated and extends radially along the pivoting shaft. An extending direction of the switching button is not parallel to an extending direction of the recess when the switching button is in the locking position. The extending direction of the switching button is parallel to the extending direction of the recess when the switching button is in the releasing position.

In an embodiment, the side of the second clamping member opposite to the first clamping member is further provided with a second pressed portion adjacent to the recess. The first pressed portion and the second pressed portion are respectively disposed at two opposite sides of the recess. The switching button is further provided with a second pressing portion. The first pressing portion and the second pressing portion are respectively disposed at two opposite sides of the pivoting shaft. The second pressing portion abuts against the second pressed portion when the switching button is in the locking position. The second pressing portion detaches from the second pressed portion when the switching button is in the releasing position.

In an embodiment, each of the first pressed portion and the second pressed portion is formed a concave structure. Each of the first pressing portion and the second pressing portion is formed a protruding structure. When the switching button is in the locking position, the first pressing portion engages with the first pressed portion, and the second pressing portion engages with the second pressed portion.

In an embodiment, the pivoting shaft includes a first fastener and a second fastener. One end of the first fastener is provided with a first stopping portion and another end of the first fastener is provided with a first threaded portion. The first stopping portion abuts against one side of the first clamping member opposite to the second clamping member. One end of the second fastener is provided with a second stopping portion and another end of the second fastener is provided with a second threaded portion. The second stopping portion abuts against one side of the switching button opposite to the second clamping member. The second threaded portion is engaged with the first threaded portion.

In an embodiment, the first connecting portion is provided with a through hole. The second clamping portion and the second connecting portion are respectively disposed at two opposite ends of the second clamping member. The second connecting portion is provided with a swing portion and a hooking portion. The swing portion is inserted into the through hole. The hooking portion passes through the through hole and abuts against the side of the first clamping member opposite to the second clamping member.

In an embodiment, the first clamping member is provided with a handle. The first clamping portion and the handle are respectively disposed at two opposite ends of the first clamping member. The first connecting portion is disposed between the first clamping portion and the handle.

The present invention will become clearer in light of the following detailed description of illustrative embodiments of this invention described in connection with the drawings.

DETAILED DESCRIPTION

Figure 1:
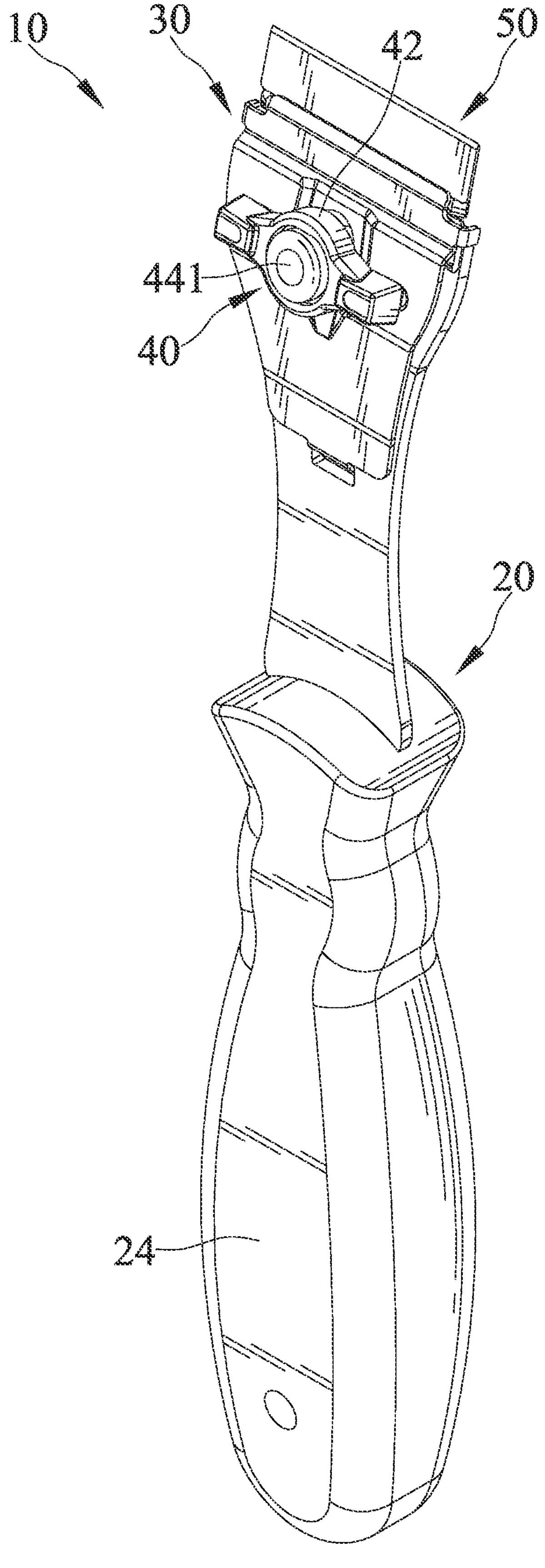
FIG. 1 is a perspective view of a scraper of an embodiment according to the present invention.
Figure 2:
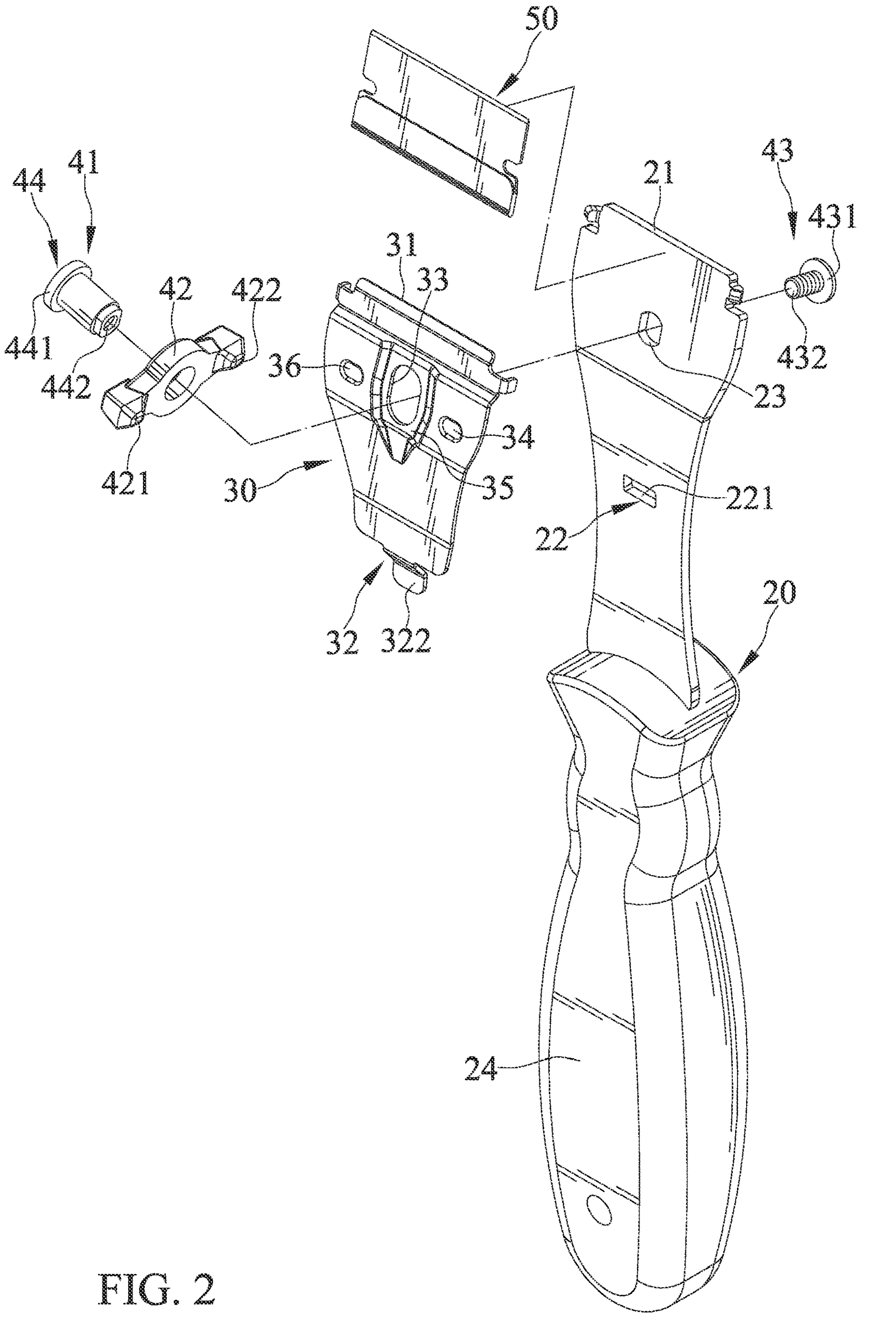
FIG. 2 is an exploded perspective view of the scraper of FIG. 1.
Figure 3:
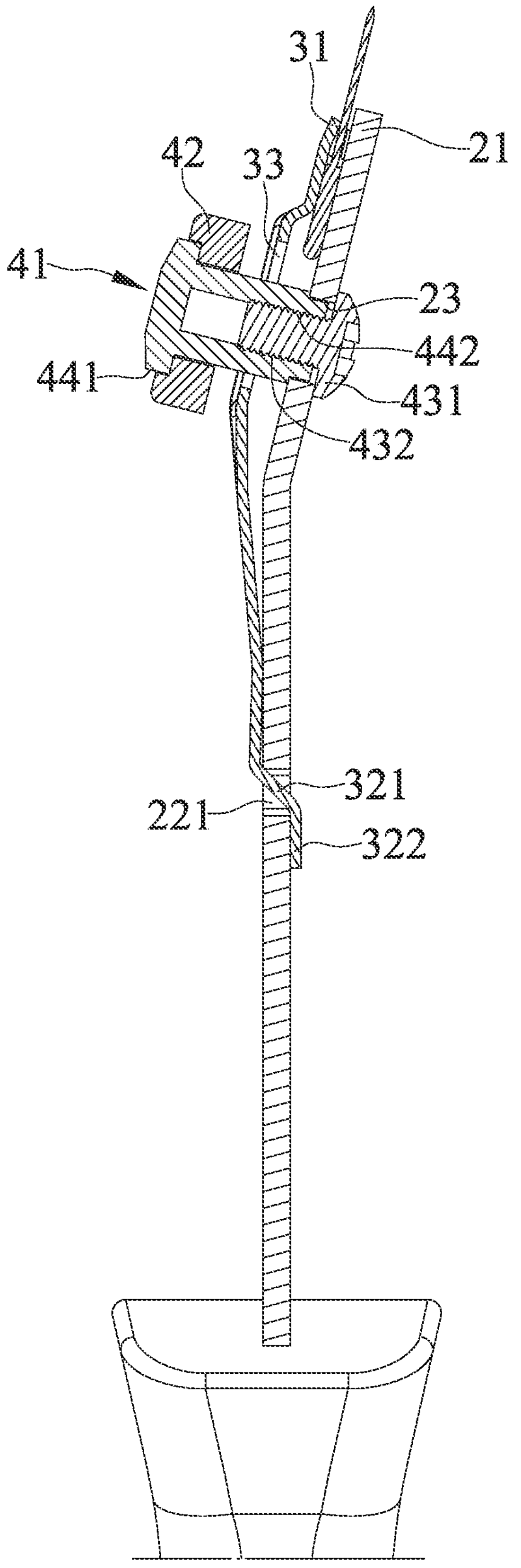
FIGS. 3 and 4 are cross sectional views of the scraper of FIG. 1 and shows the switching button disposed in the locked position.
Figure 4:
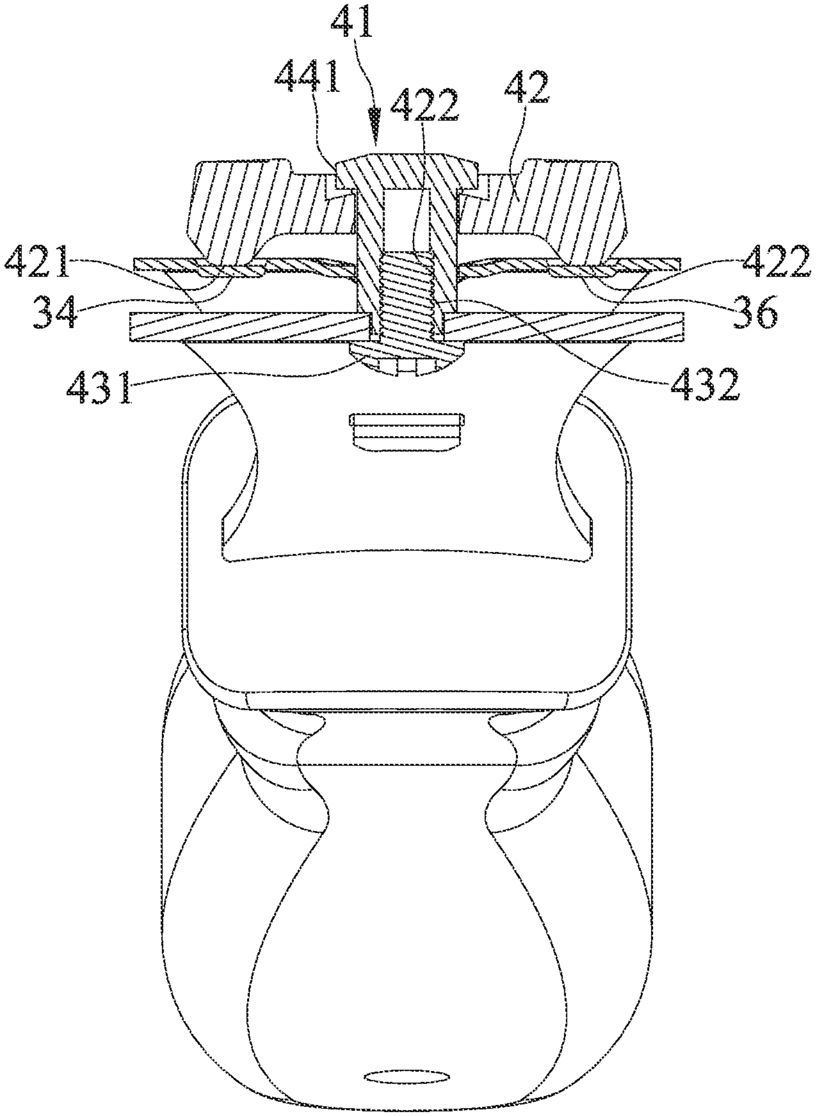
Figure 5:
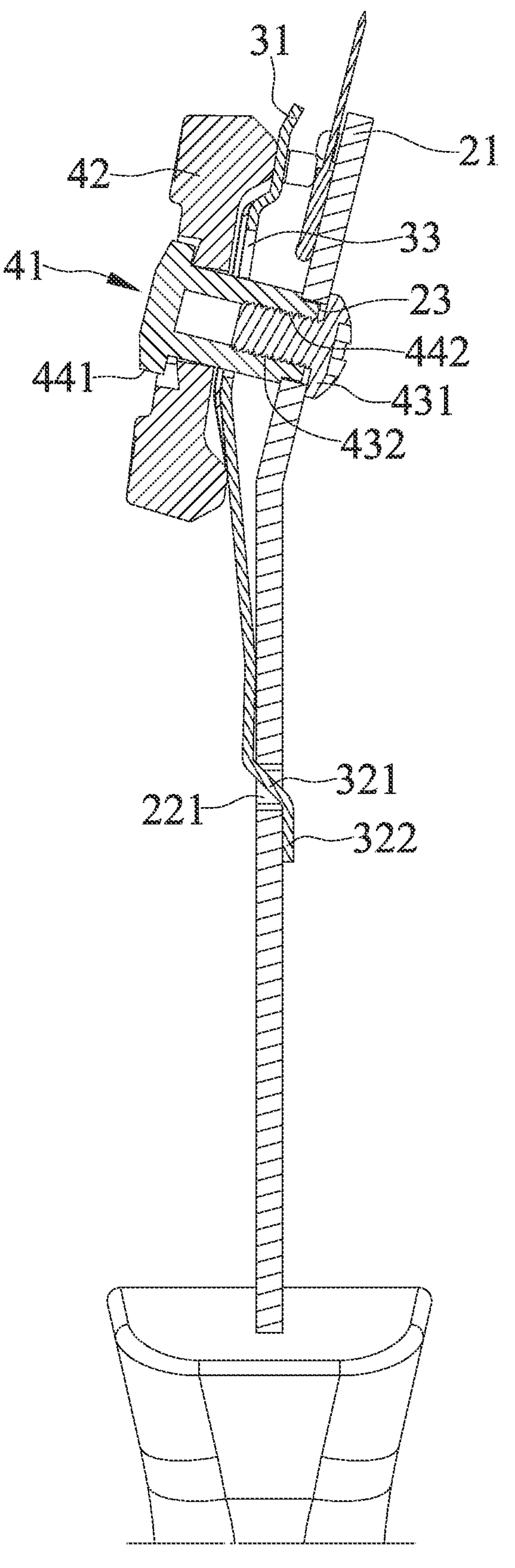
FIGS. 5 and 6 are cross sectional views of the scraper of FIG. 1 and shows the switching button disposed in the unlocked position.
Figure 6:
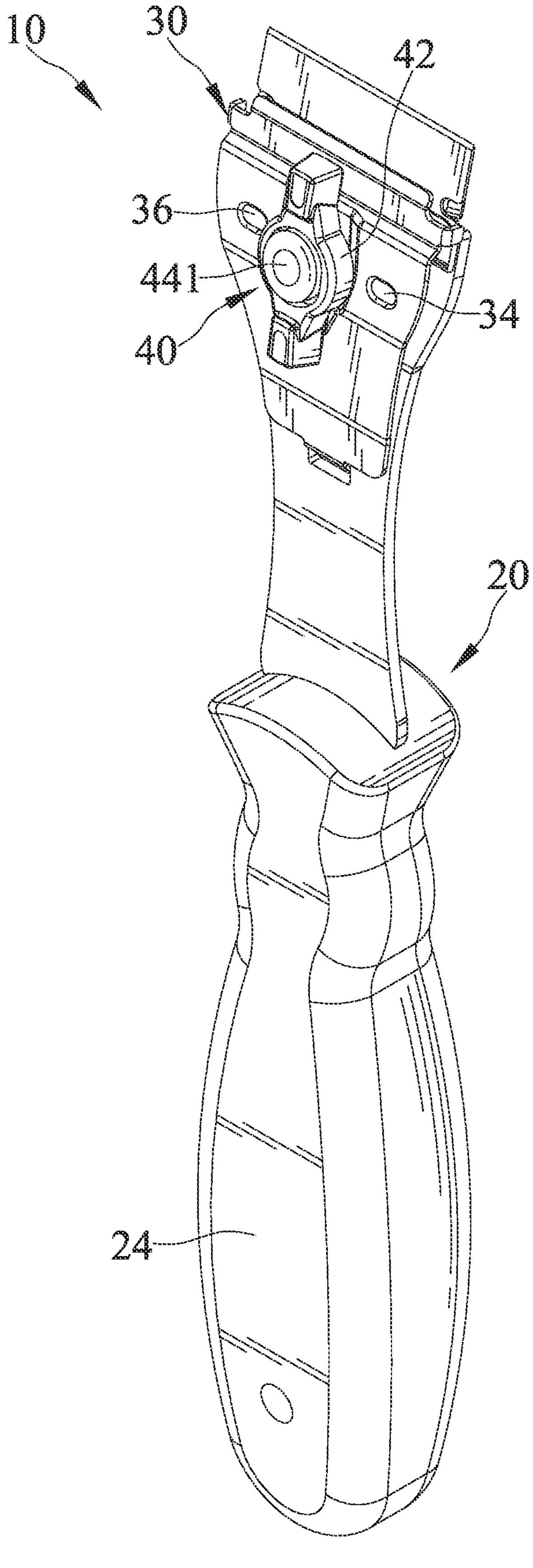

FIGS. 1-6 show a scraper 10 of an embodiment according to the present invention. The scraper 10 includes a first clamping member 20, a second clamping member 30, and a locking device 40.

The first clamping member 20 has a first clamping portion 21, a first connecting portion 22, and a first pivoting portion 23 disposed between the first clamping portion 21 and the first connecting portion 22.

The second clamping member 30 has a second clamping portion 31, a second connecting portion 32 connected with the first connecting portion 22, and a second pivoting portion 33 disposed between the second clamping portion 31 and the second connecting portion 32. One side of the second clamping member 30 opposite to the first clamping member 20 is provided with a first pressed portion 34. The second clamping member 30 is elastically swayable to cause the second clamping portion 31 to approach or move away from the first clamping portion 21.

The locking device 40 includes a pivoting shaft 41 connected with the first pivoting portion 23 and the second pivoting portion 33, and a switching button 42 disposed on the side of the second clamping member 30 opposite to the first clamping member 20 and connected with the pivoting shaft 41. The switching button 42 is provided with a first pressing portion 421 and is relatively rotatable between a locking position and a releasing position with the pivoting shaft 41 as the center with an angle of less than degrees. The first pressing portion 421 abuts against the first pressed portion 34 to cause the second clamping portion 31 to approach the first clamping portion 21 when the switching button 42 is in the locking position. The first pressing portion 421 detaches from the first pressed portion 34 to cause the second clamping portion 31 to move away from the first clamping portion 21 when the switching button 42 is in the releasing position.

The side of the second clamping member 30 opposite to the first clamping member 20 is further provided with a recess 35. One end of the recess 35 is adjacent to the second clamping portion 31 and another end of the recess 35 is adjacent to the second connecting portion 32. The second pivoting portion 33 is disposed in the recess 35. The first pressed portion 34 is adjacent to the recess 35. The switching button 42 is elongated and extends radially along the pivoting shaft 41. An extending direction of the switching button 42 is not parallel to an extending direction of the recess 35 when the switching button 42 is in the locking position. The extending direction of the switching button 42 is parallel to the extending direction of the recess 35 when the switching button 42 is in the releasing position.

The side of the second clamping member 30 opposite to the first clamping member 20 is further provided with a second pressed portion 36 adjacent to the recess 35. The first pressed portion 34 and the second pressed portion 36 are respectively disposed at two opposite sides of the recess 35. The switching button 42 is further provided with a second pressing portion 422. The first pressing portion 421 and the second pressing portion 422 are respectively disposed at two opposite sides of the pivoting shaft 41. The second pressing portion 422 abuts against the second pressed portion 36 when the switching button 42 is in the locking position. The second pressing portion 422 detaches from the second pressed portion 36 when the switching button 42 is in the releasing position.

Each of the first pressed portion 34 and the second pressed portion 36 may be formed a concave structure, and each of the first pressing portion 421 and the second pressing portion 422 may be formed a protruding structure. When the switching button 42 is in the locking position, the first pressing portion 421 engages with the first pressed portion 34, and the second pressing portion 422 engages with the second pressed portion 36.

The pivoting shaft 41 includes a first fastener 43 and a second fastener 44. One end of the first fastener 43 is provided with a first stopping portion 431 and another end of the first fastener 43 is provided with a first threaded portion 432. The first stopping portion 431 abuts against one side of the first clamping member 20 opposite to the second clamping member 30. One end of the second fastener 44 is provided with a second stopping portion 441 and another end of the second fastener 44 is provided with a second threaded portion 442. The second stopping portion 441 abuts against one side of the switching button 42 opposite to the second clamping member 30. The second threaded portion 442 is engaged with the first threaded portion 432.

The first connecting portion 22 is provided with a through hole 221. The second clamping portion 31 and the second connecting portion 32 are respectively disposed at two opposite ends of the second clamping member 30. The second connecting portion 32 is provided with a swing portion 321 and a hooking portion 322. The swing portion 321 is inserted into the through hole 221. The hooking portion 322 passes through the through hole 221 and abuts against the side of the first clamping member 20 opposite to the second clamping member 30.

The first clamping member 20 is provided with a handle 24. The first clamping portion 21 and the handle 24 are respectively disposed at two opposite ends of the first clamping member 20. The first connecting portion 22 is disposed between the first clamping portion 21 and the handle 24.

Thus, the scraper 10 can replace a scraper blade 50 only by rotating the switching button 42 of the locking device 40. Moreover, the structure of the scraper 10 is very simple, and the operations of production, manufacture and assembly can be performed quickly.

Although specific embodiments have been illustrated and described, numerous modifications and variations are still possible without departing from the scope of the invention. The scope of the invention is limited by the accompanying claims.

The invention claimed is:

1. A scraper comprising:

a first clamping member having a first clamping portion, a first connecting portion, and a first pivoting portion disposed between the first clamping portion and the first connecting portion;

a second clamping member having a second clamping portion, a second connecting portion connected with the first connecting portion, and a second pivoting portion disposed between the second clamping portion and the second connecting portion, wherein one side of the second clamping member opposite to the first clamping member is provided with a first pressed portion, wherein the second clamping member is elastically swayable to cause the second clamping portion to approach or move away from the first clamping portion; and a locking device including a pivoting shaft connected with the first pivoting portion and the second pivoting portion, and a switching button disposed on the side of the second clamping member opposite to the first clamping member and connected with the pivoting shaft, wherein the switching button is provided with a first pressing portion, wherein the switching button is relatively rotatable between a locking position and a releasing position with the pivoting shaft as the center with an angle of less than 180 degrees, wherein the first pressing portion abuts against the first pressed portion to cause the second clamping portion to approach the first clamping portion when the switching button is in the locking position, and wherein the first pressing portion detaches from the first pressed portion to cause the second clamping portion to move away from the first clamping portion when the switching button is in the releasing position.

2. The scraper as claimed in claim 1, wherein the side of the second clamping member opposite to the first clamping member is further provided with a recess, wherein one end of the recess is adjacent to the second clamping portion and another end of the recess is adjacent to the second connecting portion, wherein the second pivoting portion is disposed in the recess, wherein the first pressed portion is adjacent to the recess, wherein the switching button is elongated and extends radially along the pivoting shaft, wherein an extending direction of the switching button is not parallel to an extending direction of the recess when the switching button is in the locking position, and wherein the extending direction of the switching button is parallel to the extending direction of the recess when the switching button is in the releasing position.

3. The scraper as claimed in claim 2, wherein the side of the second clamping member opposite to the first clamping member is further provided with a second pressed portion adjacent to the recess, wherein the first pressed portion and the second pressed portion are respectively disposed at two opposite sides of the recess, wherein the switching button is further provided with a second pressing portion, wherein the first pressing portion and the second pressing portion are respectively disposed at two opposite sides of the pivoting shaft, wherein the second pressing portion abuts against the second pressed portion when the switching button is in the locking position, and wherein the second pressing portion detaches from the second pressed portion when the switching button is in the releasing position.

4. The scraper as claimed in claim 3, wherein each of the first pressed portion and the second pressed portion is formed a concave structure, wherein each of the first pressing portion and the second pressing portion is formed a protruding structure, and wherein when the switching button is in the locking position, the first pressing portion engages with the first pressed portion, and the second pressing portion engages with the second pressed portion.

5. The scraper as claimed in claim 4, wherein the pivoting shaft includes a first fastener and a second fastener, wherein one end of the first fastener is provided with a first stopping portion and another end of the first fastener is provided with a first threaded portion, wherein the first stopping portion abuts against one side of the first clamping member opposite to the second clamping member, wherein one end of the second fastener is provided with a second stopping portion and another end of the second fastener is provided with a second threaded portion, wherein the second stopping portion abuts against one side of the switching button opposite to the second clamping member, and wherein the second threaded portion is engaged with the first threaded portion.

6. The scraper as claimed in claim 4, wherein the first connecting portion is provided with a through hole, wherein the second clamping portion and the second connecting portion are respectively disposed at two opposite ends of the second clamping member, wherein the second connecting portion is provided with a swing portion and a hooking portion, wherein the swing portion is inserted into the through hole, and wherein the hooking portion passes through the through hole and abuts against the side of the first clamping member opposite to the second clamping member.

7. The scraper as claimed in claim 4, wherein the first clamping member is provided with a handle, wherein the first clamping portion and the handle are respectively disposed at two opposite ends of the first clamping member, and wherein the first connecting portion is disposed between the first clamping portion and the handle.

* * * * *